(12) United States Patent
Jaskot et al.

(10) Patent No.: US 10,493,607 B2
(45) Date of Patent: Dec. 3, 2019

(54) CONCRETE NAILER HAVING MAGAZINE CUTOUT FOR DEEP TRACKS

(71) Applicant: BLACK & DECKER INC., New Britain, CT (US)

(72) Inventors: Erin Elizabeth Jaskot, Richmond, VA (US); Stuart E. Garber, Towson, MD (US)

(73) Assignee: Black & Decker, Inc., New Britain, CT (US)

( * ) Notice: Subject to any disclaimer, the term of this patent is extended or adjusted under 35 U.S.C. 154(b) by 447 days.

(21) Appl. No.: 15/195,057

(22) Filed: Jun. 28, 2016

(65) Prior Publication Data

US 2017/0368671 A1 Dec. 28, 2017

(51) Int. Cl.
| | |
|---|---|
| *B25C 1/00* | (2006.01) |
| *B21D 39/00* | (2006.01) |
| *C25C 1/18* | (2006.01) |
| *B25C 3/00* | (2006.01) |
| *B23P 19/00* | (2006.01) |
| *B25C 1/06* | (2006.01) |
| *B25C 1/18* | (2006.01) |

(52) U.S. Cl.
CPC .............. *B25C 1/001* (2013.01); *B21D 39/00* (2013.01); *B23P 19/003* (2013.01); *B25C 1/005* (2013.01); *B25C 1/06* (2013.01); *B25C 1/182* (2013.01); *B25C 1/184* (2013.01); *B25C 3/002* (2013.01); *B25C 3/006* (2013.01); *B23P 19/001* (2013.01); *B25C 1/003* (2013.01); *Y10T 29/49833* (2015.01); *Y10T 29/53478* (2015.01); *Y10T 29/53487* (2015.01)

(58) Field of Classification Search
CPC ......... B25C 1/001; B25C 1/003; B25C 1/005; B25C 1/06; B25C 1/182; B25C 1/184; B25C 3/002; B25C 3/006; Y10T 29/53478; Y10T 29/53487; Y10T 29/49833; B23P 19/001; B23P 19/003
See application file for complete search history.

(56) References Cited

U.S. PATENT DOCUMENTS 3,893,610 A * 7/1975 Smith ..................... B25C 1/041
227/8
4,197,974 A 4/1980 Morton et al.
(Continued)

FOREIGN PATENT DOCUMENTS

| | | |
|---|---|---|
| EP | 1207017 | 5/2002 |
| EP | 1798003 | 6/2007 |

(Continued)

OTHER PUBLICATIONS

Extended European Search Report dated Mar. 28, 2018.
(Continued)

*Primary Examiner* — Jermie E Cozart
(74) *Attorney, Agent, or Firm* — Rhonda L. Barton

(57) ABSTRACT

A concrete nailer has a cutout defined by a magazine. The cutout is disposed proximate the drive track of the concrete nailer and provides the concrete nailer with sufficient reach to perpendicularly nail a complete range of U-shaped channels or track available to the job site against concrete, even though the magazine accommodates both long and short nails. The concrete nailer has the added ability to nail thick boards like 2×4's to concrete.

11 Claims, 16 Drawing Sheets

(56) References Cited

U.S. PATENT DOCUMENTS

| | | | |
|---|---|---|---|
| 4,404,894 A | 9/1983 | Oesterle | |
| 4,558,811 A | 12/1985 | Klaus | |
| 4,863,089 A | 9/1989 | McCardle et al. | |
| 6,053,389 A | 4/2000 | Chu et al. | |
| 6,131,787 A | 10/2000 | Curtis | |
| 6,431,428 B1 | 8/2002 | Chen | |
| 6,598,777 B2 | 7/2003 | Osuga et al. | |
| D498,127 S | 11/2004 | Leasure | |
| D509,418 S | 9/2005 | Leasure | |
| 6,978,920 B2 | 12/2005 | Hamada et al. | |
| D520,839 S | 5/2006 | Miwa | |
| D551,931 S | 10/2007 | Leasure | |
| D556,003 S | 11/2007 | Buck | |
| D562,664 S | 2/2008 | Buck | |
| 7,690,546 B2 | 4/2010 | Cortez | |
| 7,748,588 B2 | 7/2010 | Osuga et al. | |
| 7,874,469 B2 | 1/2011 | Liu | |
| 8,091,752 B2* | 1/2012 | Jian | B25C 1/005 227/119 |
| 8,181,836 B2 | 5/2012 | Shkolnikov et al. | |
| 2002/0104866 A1* | 8/2002 | Miller | B25C 1/005 227/8 |
| 2006/0102685 A1* | 5/2006 | Phillips | B25C 1/005 227/120 |
| 2006/0261128 A1 | 11/2006 | Wen | |
| 2009/0050668 A1* | 2/2009 | Jian | B25C 1/005 227/126 |
| 2010/0051666 A1 | 3/2010 | Shkolnikov et al. | |
| 2012/0187177 A1 | 7/2012 | Myburgh | |
| 2014/0361066 A1 | 12/2014 | Liu et al. | |
| 2015/0122867 A1* | 5/2015 | Segura | B25C 1/005 227/109 |

FOREIGN PATENT DOCUMENTS

| | | |
|---|---|---|
| EP | 1864759 | 12/2007 |
| EP | 1892061 A | 2/2008 |
| WO | 2010027943 A1 | 3/2010 |

OTHER PUBLICATIONS

Hilti DX460—at least as early as Mar. 17, 2016.
Hilti DX351—at least as early as Mar. 17, 2016.
Ramset XT540—at least as early as Mar. 17, 2016.
Hilti GX120—at least as early as Mar. 17, 2016.
Simpson GCN-MEPMAG—at least as early as Mar. 17, 2016.
Ramset Trackfast—at least as early as Mar. 17, 2016.
T3 Ramset—at least as early as Mar. 17, 2016.
Hilti GX2—at least as early as Mar. 17, 2016.

* cited by examiner

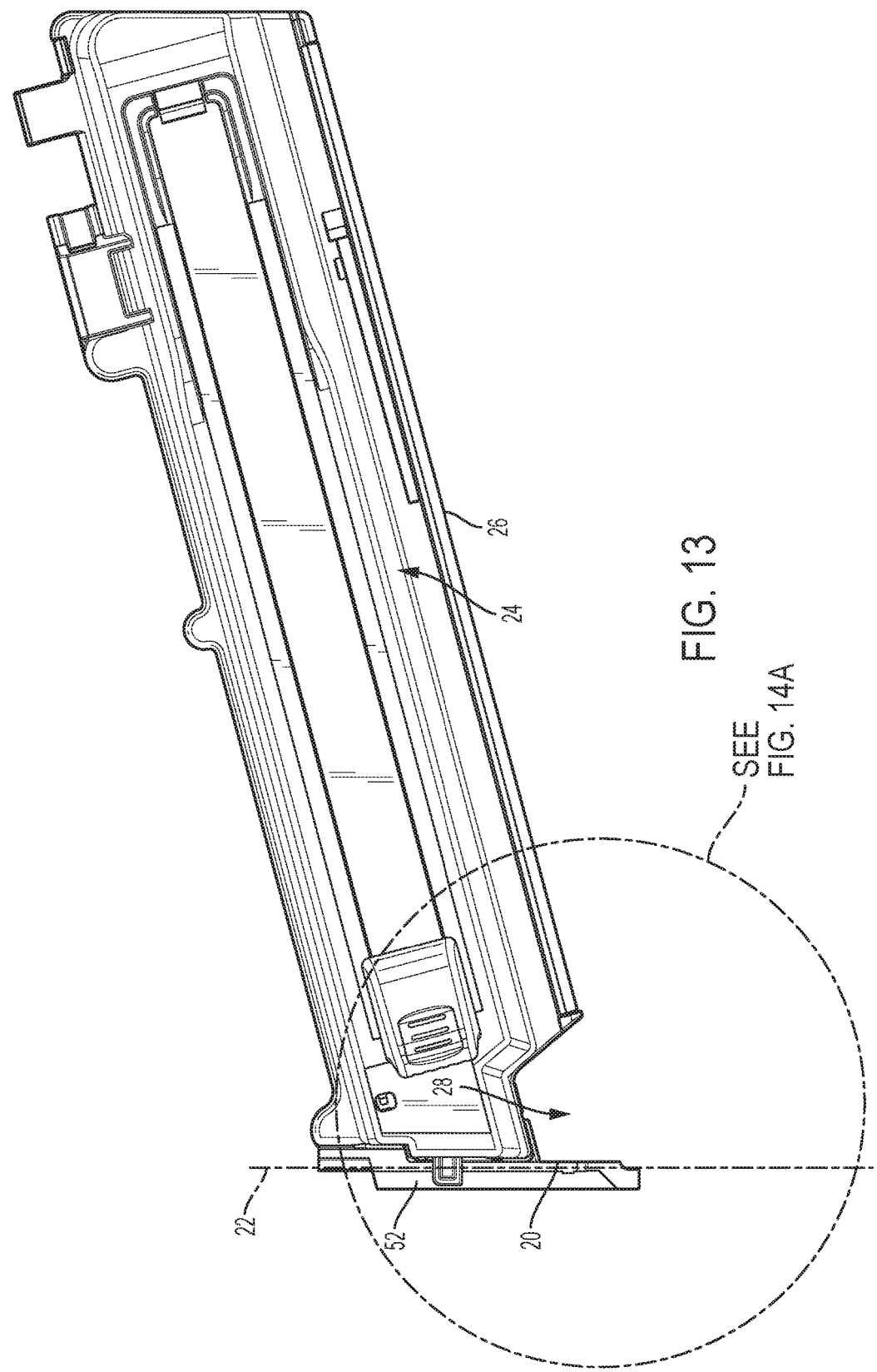

CONCRETE NAILER HAVING MAGAZINE CUTOUT FOR DEEP TRACKS

BACKGROUND OF THE INVENTION

Field of the Invention

The present invention relates to fastener tools, and more particularly to concrete nailers.

Description of the Related Art

Concrete nailers are quite different from conventional nailers designed simply for nailing wood and metal together. As may be imagined, driving a nail into concrete requires much higher energy and produces greater impacts than driving nails into metal or wood. Driving a nail into concrete requires that the systems of a concrete nailer be made much more robustly, and that those systems be especially configured to deal with the particular challenges presented to a concrete nailer on a job site, which are not encountered by conventional nailers. Also, it has now become imperative that, for maximum flexibility, concrete nailers use magazines which can accommodate nails ranging in length from ½ inch to at least 2¼ inches. Furthermore, it is important that when driving nails into a concrete work surface, the nail be oriented as close to 90° as possible to the concrete, so that the concrete does not chip, crack or break away, as is likely to occur if the nail is impacted at an angle relative to the concrete. These requirements present a significant test for a concrete nailer when the concrete nailer is required to nail a deep track to concrete.

"Tracks" are U-shaped steel channels for holding everything from electrical conduits and piping, to partitions, other structural members, and the like. Tracks have become ubiquitous on a job site, and consequently it would be very desirable to provide a concrete nailer capable of quickly and easily nailing tracks to concrete work surfaces. However, the vast range of sizes of tracks used in construction has presented a challenge to the operator, who will frequently encounter on the same job, tracks having widths ranging from 30 mm to 100 mm, and depths ranging from 20 mm to 70 mm. On the one hand, if the operator encounters a track at the wide and shallow ends of the range (e.g. 100 mm wide×20 mm deep), the operator can position the concrete nailer so that the drive axis of the nail is maintained at 90° relative to the channel and concrete. However, as the track gets narrower and deeper, the ability of the operator to drive a nail perpendicularly into the track becomes increasingly difficult. The operator must now skew the concrete nailer so that the nail magazine, which is often mounted on a lower surface of the nailer housing, clears a vertical wall of the track. But then, as the track width approaches 30 mm and the depth approaches 70 mm (a "deep track"), it becomes almost impossible for an operator using a conventional concrete nailer having a magazine large enough to accommodate both short and long nails to drive a nail perpendicularly to the track. The magazine of such a concrete nailer blocks an operator from having sufficient "reach" into the track so that the nailer contact trip cannot be fully depressed against the base of the track, thereby preventing the nailer from being fired. To accommodate all of the sizes of tracks likely to be available on a job site, the reach should be 60-70 mm, and preferably 70 mm.

Nail lengths further complicate the concrete nailer arena. Short nails are commonly used to nail track to concrete. There are conventional concrete nailers that use magazines which only accommodate short nails. Short nails enable magazines to be made with relatively short heights, thereby creating sufficient reach for the operator to drive the nails perpendicularly to the base of the track and into the concrete. Conversely, magazines that are tall enough to accommodate long nails will also block conventional concrete nailers from satisfactorily nailing into track. "Long nails", in this context, are nails which are long enough to nail 2×4's to concrete, which means they must be at least 2¼ inches long. Nailing 2×4's to concrete is another critical job that contractors need to perform. However, switching between a short fastener magazine and a long fastener magazine results in a significant cost, because the contractor must maintain at least two nailers on the job site, one loaded with short nails and another loaded with long nails; or the contractor must provide the nailer with at least two different magazines, one containing short nails and the other containing long nails. However, switching out various magazines takes time, which increases cost.

An unsuccessful attempt has been made to solve both problems. A concrete nailer using a magazine that accommodates both short and long nails was introduced with an unusually long drive track and contact trip subassembly to artificially create enough reach for the nailer to drive nails into many sizes of tracks, as well as to accommodate 2¼ inch nails. However, generating an unusually long drive track and contact trip subassembly also requires that the rest of the nailer be made taller. The result is a concrete nailer which is heavier, more unwieldy and less able to fit into tight spaces than the other concrete nailers. (The height of the conventional nailer is 18½ inches.) Moreover, making the tool larger inevitably adds cost. However, the maximum reach attained with the conventional concrete nailer is only 50 mm, and consequently it has much less flexibility to accommodate the sizes of tracks likely to be found on the construction site then one having a reach of 70 mm.

The dilemma faced by conventional concrete nailers is shown in FIGS. 1-3, which illustrate how a first conventional concrete nailer 100, 100' is unable to accommodate both short and long nails 40, 42 and still drive them perpendicularly into a complete range of tracks 44 likely to be encountered on the job site. FIG. 1 shows that a first conventional concrete nailer 100, having a housing 102 to which is connected a magazine 104, is able to depress its contact trip 106 against the base 46 of the track 44, because the height H1 of the magazine need only accommodate short nails 40. However, as shown in FIGS. 2 and 3, when concrete nailer 100' uses a magazine 104' that has a height H2 for accommodating long nails 42 as well short nails 40, full actuation of the contact trip 106 becomes geometrically impossible when the drive axis 22 is oriented at an angle A of 90° to the base 46 of track 44. Thus, concrete nailer 100' is blocked by the conventional magazine 104' so that the contact trip 106 is held above the bottom 46 of track 44 by a distance G, and consequently is unable to fire.

Referring now to FIGS. 4, 5 and 6, a second conventional concrete nailer 200 that unsuccessfully attempts to overcome such deficiencies includes a housing 202 and a magazine 204 configured to accommodate both short and long nails 40, 42. The magazine 204 is disposed at an unusually large distance above a work surface. The purpose was to artificially create enough reach R so that the second conventional concrete nailer 200 can handle many sizes of track 44 likely to be found on a job site. However, this additional flexibility comes at a price. In order to elevate magazine 204 at such a distance above the track 44, it is also necessary concomitantly to lengthen the contact trip 206 and drive system 218. When such components as the contact trip 206 and drive system 218 are elongated, or made taller, the housing 202 and all of the other components disposed therein must also be made taller, as shown in FIGS. 5 and 6. The resulting overall height H2 above the work surface 34 of the second concrete nailer 200 must now be 18½ inches.

Thus, it can be seen that in the demanding field of concrete nailers, the ranges of track dimensions, the length of reach, and the size ranges of nails used in concrete nailer magazines are in fact critical parameters.

Consequently there has been generated a long-felt need for a concrete nailer that accommodates both short and long nails, that drives nails perpendicularly into the entire range of tracks likely to be available on a construction site, and that also has the flexibility to nail 2×4's to concrete.

SUMMARY OF THE INVENTION

In an embodiment of the present invention, a cutout is formed in the bottom of a magazine for a concrete nailer. In the concrete nailer, the cutout is proximate the concrete nailer drive track. The cutout is configured to accommodate tracks having dimensions ranging from 30 mm to 200 mm wide and from 20 mm to 70 mm deep. As such, it is possible to press the contact trip of the concrete nailer against the base of the track or channel so that the contact trip can be fully actuated, and nails can be driven perpendicularly to the base of the track and into the concrete, for a variety of track sizes.

In an embodiment of the present invention, a magazine can be configured to accommodate nails ranging in length from as short as ½ inch to as long as 2¼ inches. Thus, concrete nailers having such a magazine can drive several different sizes of nails perpendicularly into the track and concrete, and have the flexibility to nail 2×4's to concrete.

In the field of concrete nailers, to a person of ordinary skill in the art, the concrete nailer and magazine of the present invention could not actually accommodate, and satisfactorily drive, nails as short as ½ inch. The prevailing thought was, by disposing the cutout of the magazine proximate the concrete nailer drive track, short nails driven along the drive track were exposed to the cutout and would thereby lose vertical support. Without vertical support, the short nails would face serious problems in maintaining the nail alignment along the drive axis of the concrete nailer, resulting in nails that could be thrown out of alignment and jam the drive system.

However, it was discovered that by mounting nails into a plastic carrier, and then loading them into the magazine, the magazine interface and the drive track of the concrete nailer of the present invention could be configured to cooperate with the nails and carrier to drive a nail and a portion of the attached carrier along the drive axis while maintaining the desired orientation of the nail.

Accordingly, one embodiment of the concrete nailer of the present invention includes a housing and a drive system configured for driving a nail. The drive system includes a drive track configured to guide nails along a drive axis. The concrete nailer further includes a magazine connected to the housing and being configured to accept nails having lengths ranging from ½ inch to at least 2¼ inches, the magazine having a bottom portion that defines a cutout disposed proximate the drive track.

In another embodiment, the cutout is configured to accommodate U-shaped channels having widths ranging from 30 mm to 100 mm and depths ranging from 20 mm to 70 mm, while still enabling the concrete nailer to drive nails along a drive axis oriented perpendicularly to the base of the channels, such that the nails fasten the channels to concrete.

In still another embodiment, the concrete nailer includes a system configured to maintain an orientation relative to a work surface of nails as short as ½ inch along the drive axis in the drive track, notwithstanding the proximity of the nails to the cutout. The system includes a magazine interface located at one end of the magazine and disposed proximate the concrete nailer drive track, and a plastic carrier carrying a plurality of nails. The magazine interface and drive track are configured to cooperate with a portion of the plastic carrier and nails to maintain the alignment of a nail all along the drive track until the nail is driven into a workpiece.

In a further embodiment, a magazine is configured to accept nails having lengths ranging from ½ inch to at least 2¼ inches, so that the nails are oriented in the magazine to be parallel to the drive axis of a concrete nailer. The magazine includes a magazine interface configured to be positioned proximate a drive track of the concrete nailer when the magazine is attached to a bottom surface of the concrete nailer. The magazine further includes a lower portion that defines a cutout disposed proximate the magazine interface.

Yet another embodiment includes a method of nailing a U-shaped channel to concrete using a concrete nailer having a magazine, where the channel has two vertical walls, a horizontal base, and the dimensions of the channel range from 30 mm to 100 mm wide and from 20 mm to 70 mm deep. The method includes positioning a nose of the concrete nailer above the channel so that a cutout formed in the bottom of the magazine clears at least one wall of the channel; engaging the base of the channel so that a contact trip of the nailer is oriented perpendicular to the base of the channel while the cutout still clears the wall; while maintaining the orientation, pressing the contact trip against the base of the channel so that the contact trip is fully actuated; and firing a nail through the base of the channel and into the concrete.

In another embodiment, a method of maximizing the reach of a concrete nailer having a housing, a nose portion, and a contact trip includes connecting a nail magazine to the housing so that an interface of the magazine is proximate the nose portion and so that, when the contact trip is fully actuated, the distance from a work surface to a portion of the magazine proximate the nose portion lies in the range of from 60 mm to 70 mm; and wherein the nail magazine accommodates nails having lengths ranging from ½ inch to at least 2¼ inches.

In a further embodiment, a method of minimizing the height of the concrete nailer having a housing and a contact trip includes connecting a nail magazine to the housing so that the magazine provides the concrete nailer with a reach of from 60 mm to 70 mm into a U-shaped channel when the contact trip is fully actuated against the bottom of the channel; wherein the magazine accommodates nails having lengths ranging from ½ inch to at least 2¼ inches.

The present invention accordingly fulfils the long-felt need for a concrete nailer having a magazine that accommodates short and long nails and is still able to nail a complete range of channels or tracks likely to be found on a job site into concrete, as well as having the flexibility to nail 2×4's and boards of similar thicknesses to concrete.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 13 is a side elevational detail view of the magazine of FIG. 7.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 7:
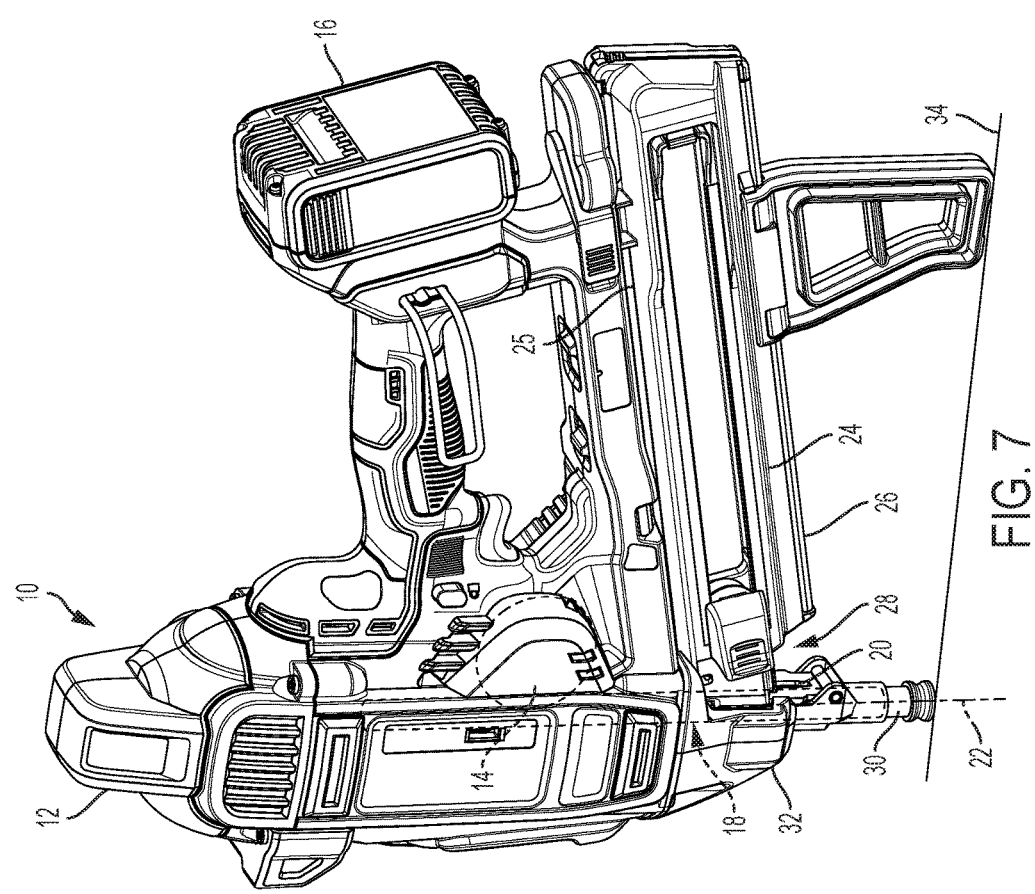
FIG. 7 is a perspective view of one embodiment of a concrete nailer and magazine according to the present invention, with the contact trip shown in the extended position.

Referring now to the drawings and particularly to FIG. 7, a cordless concrete nailer 10 in accordance with an embodiment of the present invention includes a housing 12, a motor 14 (shown schematically in phantom) disposed in the housing, a battery pack 16 for providing power to the motor, and a drive system 18 (also shown schematically in phantom) configured for driving a nail and operatively associated with the motor. The drive system 18 includes a drive track 20 disposed parallel to a drive axis 22. The concrete nailer 10 further includes a magazine 24 connected to a bottom surface 25 of the housing 12. A bottom portion 26 of the magazine 24 in turn defines a cutout 28 which is disposed proximate the drive track 20 when the magazine 24 is connected to the concrete nailer housing 12. A contact trip 30 extending from a nose 32 of the housing 12 is operatively associated with the drive system 18, and is coaxial with the drive axis 22. In operation, nails are fed from the magazine 24 and into engagement with the drive track 20. When an operator presses the contact trip 30 against a work surface 34, the contact trip is moved upwards to its actuated position, thus completing an electrical circuit (not shown) which permits the concrete nailer 10 to be fired, thereby driving nails along the drive track 20, out the bottom of the contact trip 30, and into the work surface.

Although the concrete nailer 10 is described as having an electric drive system 18, the magazine 24 may also be used in conjunction with concrete nailers having other drive systems, including without limitation pneumatic, hydraulic, powder-actuated/explosive, and gas/explosive.

Figure 8:
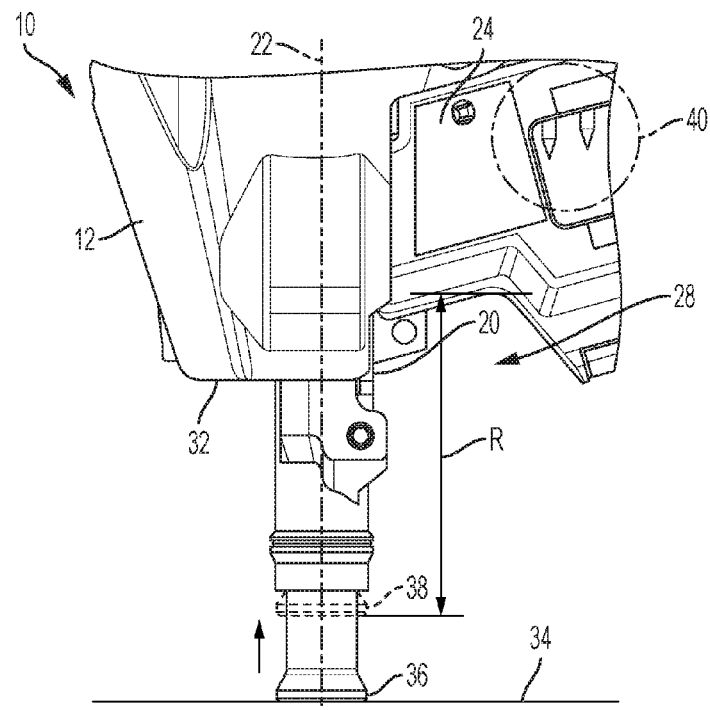
FIG. 8 is an enlarged partial elevational detail view of the concrete nailer and magazine of FIG. 7, with the actuated position of the contact trip shown in phantom, and illustrating short nails loaded in the magazine.
Figure 9:
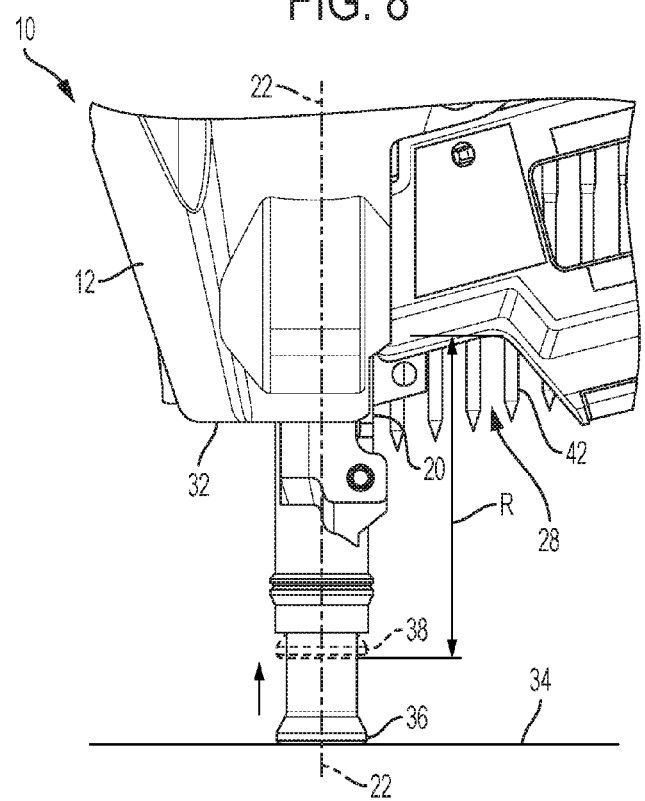
FIG. 9 is a view similar to FIG. 8, but showing long nails loaded in the magazine.

FIGS. 8 and 9 show the concrete nailer 10 in which the magazine 24 accommodates both short nails 40 (FIG. 8) and long nails 42 (FIG. 9). One embodiment of the magazine 24 accommodates nails ranging in length from a small as ½ inch to at least as long as 2¼ inches, thus providing the concrete nailer 10 with considerable flexibility.

Still referring to FIGS. 8 and 9, the unique cooperation of components of the concrete nailer 10 and magazine 24 allows the concrete nailer to have considerable "reach" R when the contact trip 30 is moved from an extended position 36 to an actuated position 38 (shown in phantom). This cooperation enables a contractor to use the concrete nailer 10 in constricted spaces and in connection with workpieces having challenging geometries.

Figure 10:
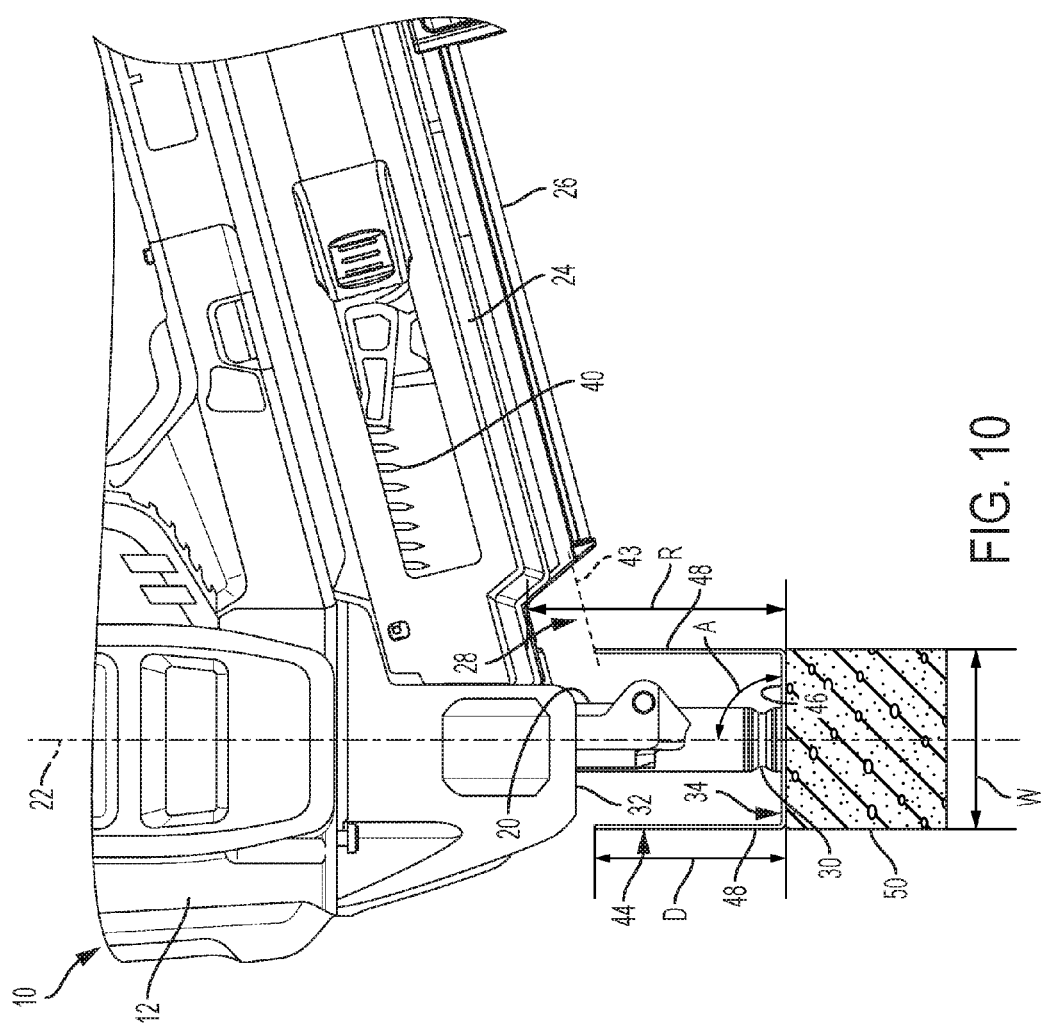
FIG. 10 is an enlarged partial elevational detail view of the concrete nailer and magazine of FIG. 7, illustrating the contact trip of the concrete nailer oriented along a drive axis and fully actuated against the base of a track to be nailed to concrete.
Figure 11:
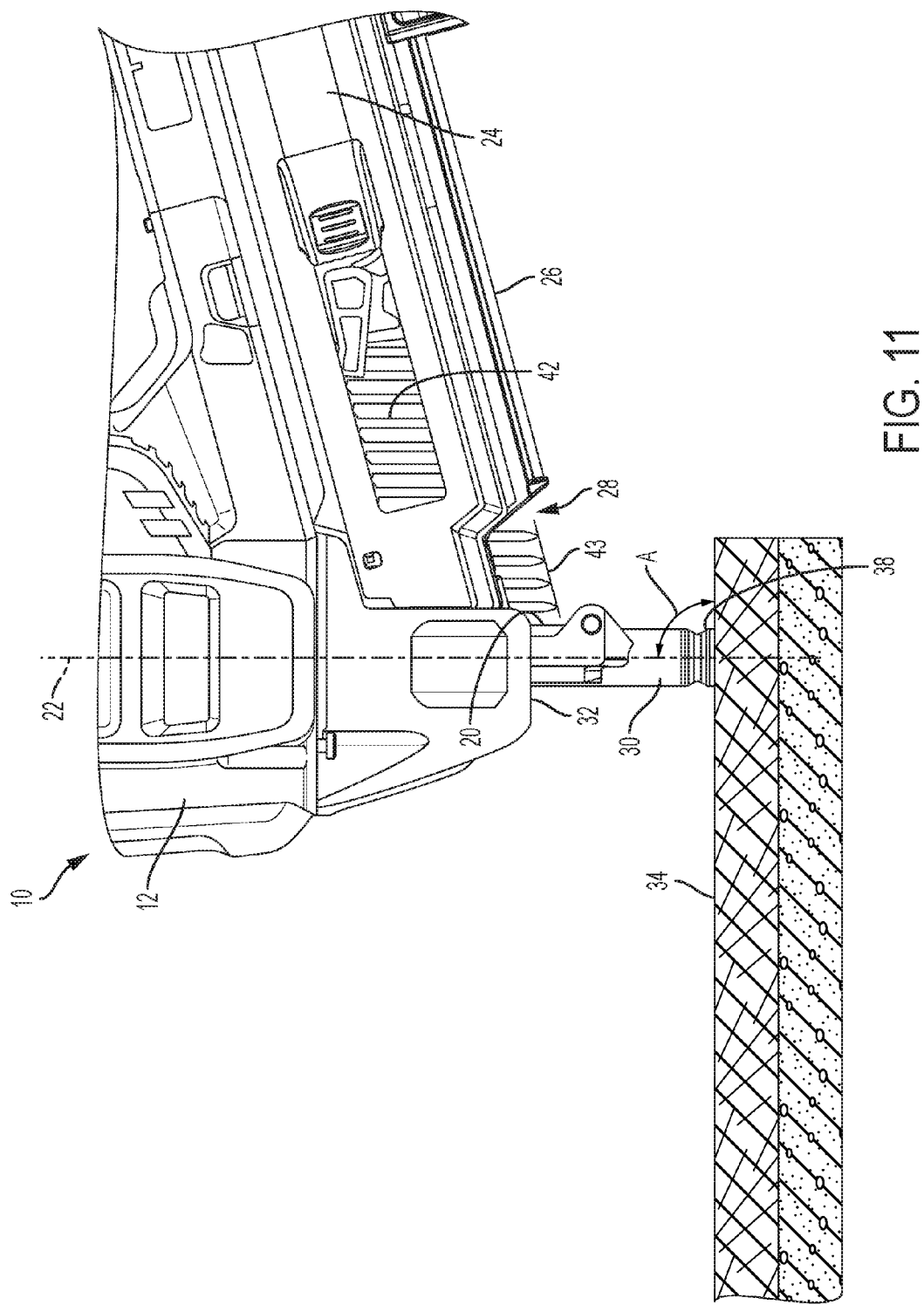
FIG. 11 is a view similar to FIG. 10, but showing the concrete nailer and magazine of FIG. 7 driving long nails into a 2×4 and concrete.

FIG. 10 illustrates how the concrete nailer 10 easily handles one of the most difficult of workpiece geometries likely to be encountered on a job site, namely, when the concrete nailer is required to nail a U-shaped metal channel or "track" 44 to concrete 50. The sizes of track which are likely to be found on a job site have widths W at the base 46 ranging from 30 mm to 100 mm, and depths D of walls 48 ranging from 20 mm to 70 mm. As previously noted, where this gets particularly challenging for a concrete nailer is when the track dimensions approach the narrowest but tallest ends of the range, namely, when the track measures 30 mm wide, but is 70 mm deep. That is because, when nailing concrete, it is very important to maintain the angle A of the drive axis 22 as close to 90° relative to the concrete as possible. However, as shown in FIG. 10, the reach R generated by the concrete nailer 10 is at least 70 mm. Therefore, even though the magazine 24 accommodates both short nails 40, as shown in FIG. 10, and long nails 42 (including nails at least as long as 2¼ inches), as shown in FIG. 11, the path 43 of the tips of the long nails 42 (see FIGS. 10 and 11) is still above the walls 48 of track 44. This enables the concrete nailer 10 using the magazine 24 to maintain the drive axis 22 perpendicular to the concrete 50, thereby successfully tackling workpiece geometries which, to date, have been difficult, if not impossible, for conventional concrete nailers to successfully handle. (It should be noted that, although the optimum orientation of the drive axis 22 to the work surface 34 is 90°, the concrete nailer 10 is capable of maintaining the orientation of the drive axis at any desired angle relative to the work surface.)

Figure 1:
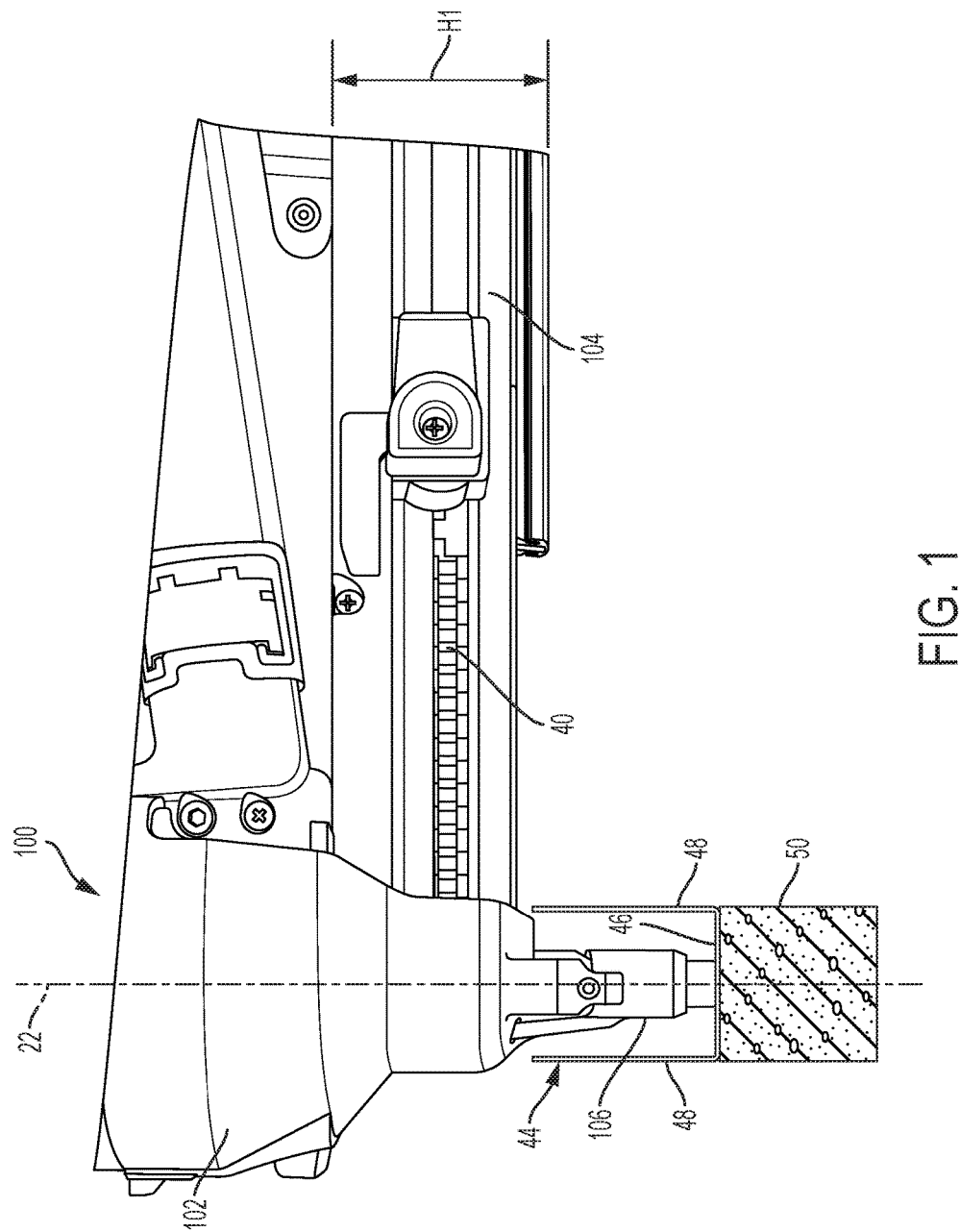
FIG. 1 is a partial elevational sectional detail view of a conventional concrete nailer using a magazine loaded with short nails, and driving the nails into a track and concrete.
Figure 2:
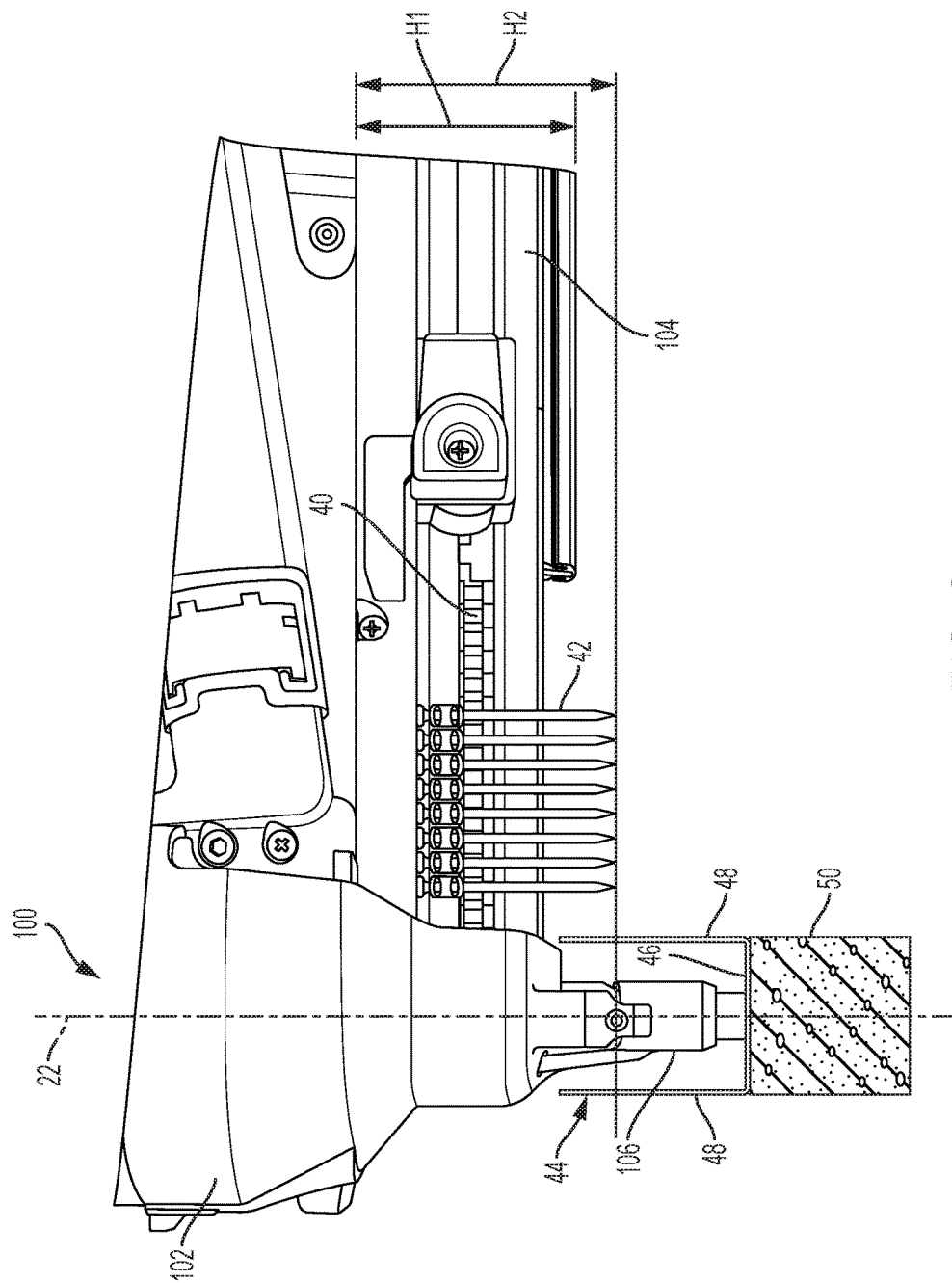
FIG. 2 is a view similar to that of FIG. 1, with long nails shown superimposed over the short nails for contrast.
Figure 3:
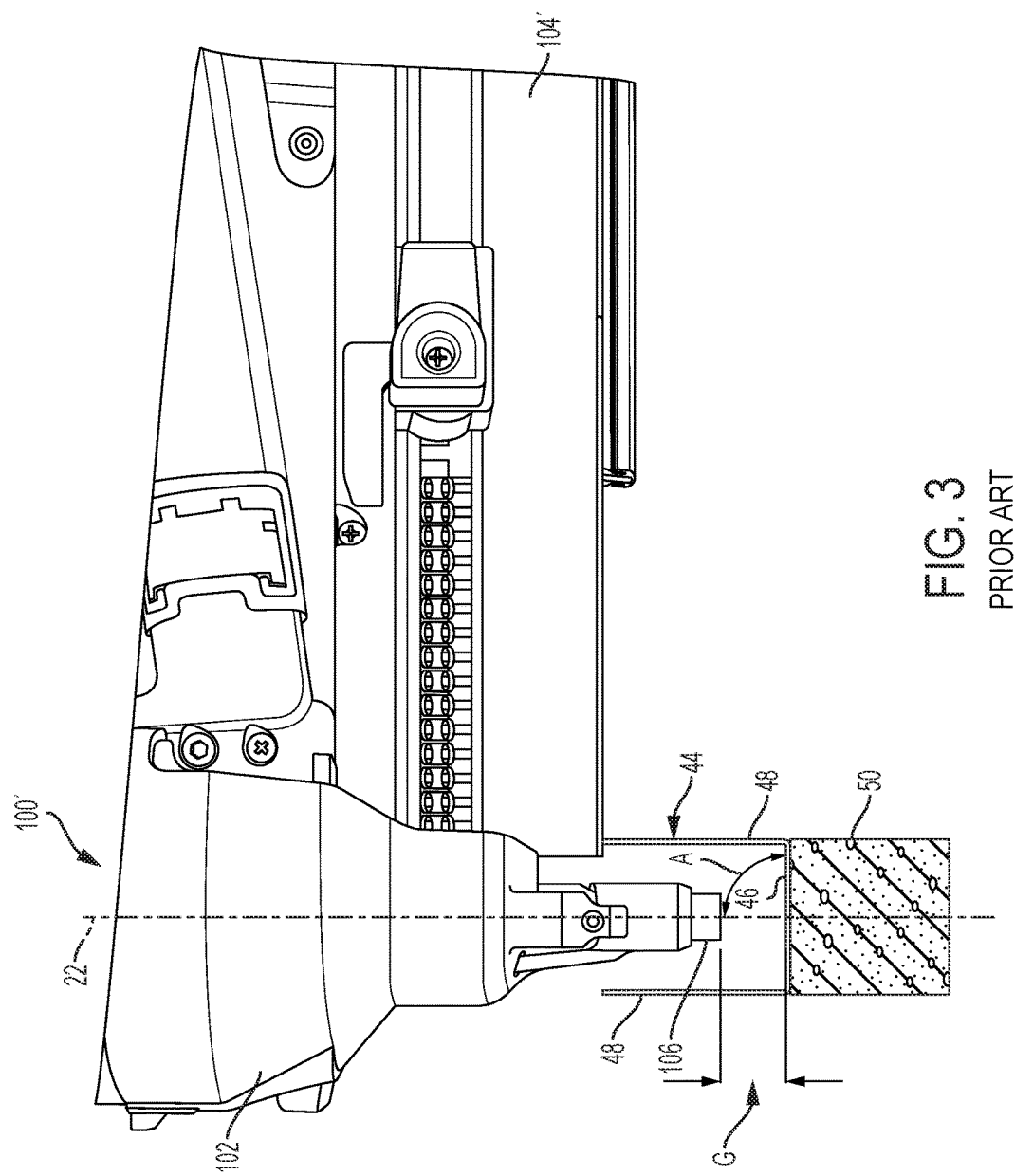
FIG. 3 is a view similar to those of FIGS. 1 and 2, and illustrating the problems encountered by a conventional concrete nailer when attempting to nail a track to concrete using a magazine configured to accept both short and long nails.
Figure 4:
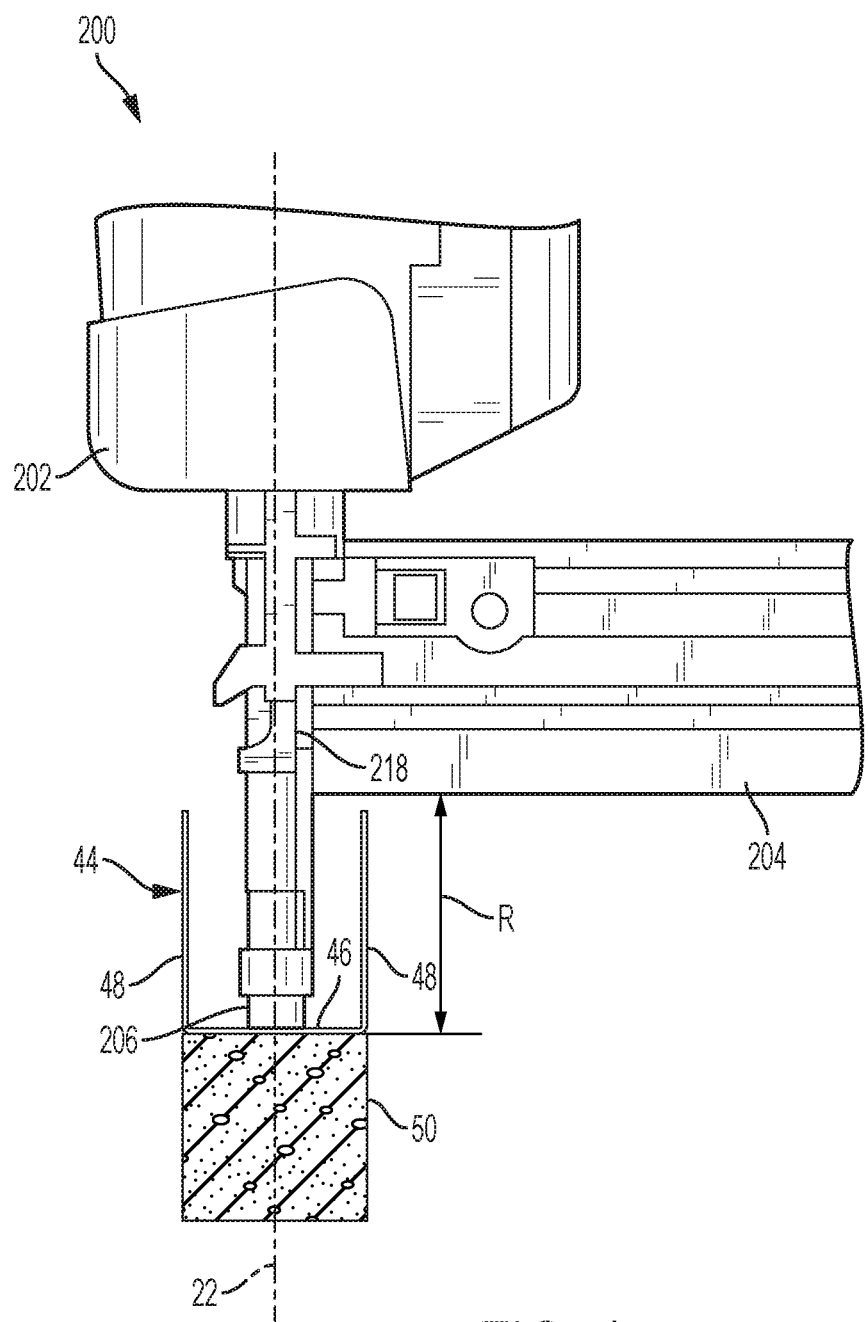
FIG. 4 is a partial elevational detail view of a conventional concrete nailer using a drive system, drive track and contact trip made unusually long to artificially create enough reach to nail many sizes of track to concrete.
Figure 5:
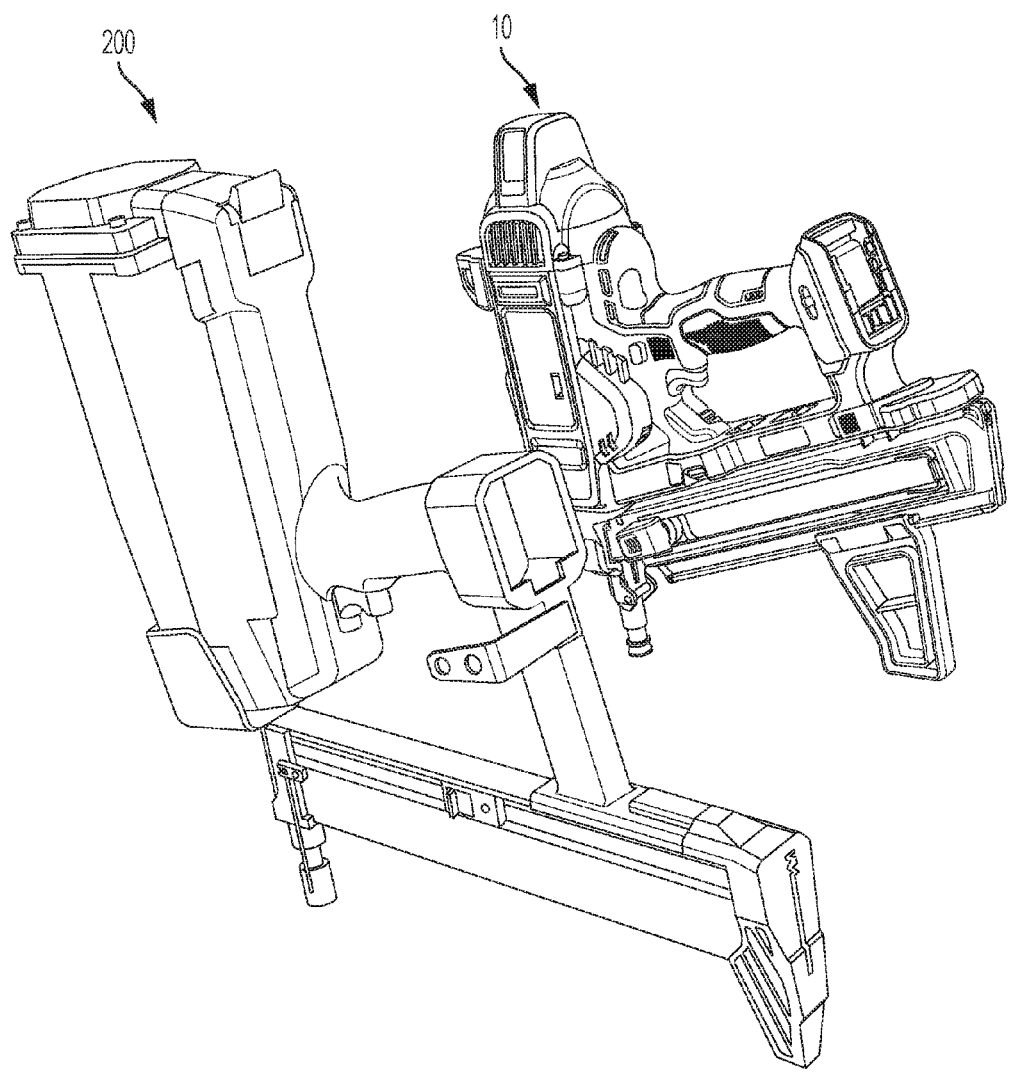
FIG. 5 is a rear perspective view of the conventional nailer of FIG. 4 positioned next to the concrete nailer and magazine of the present invention.
Figure 6:
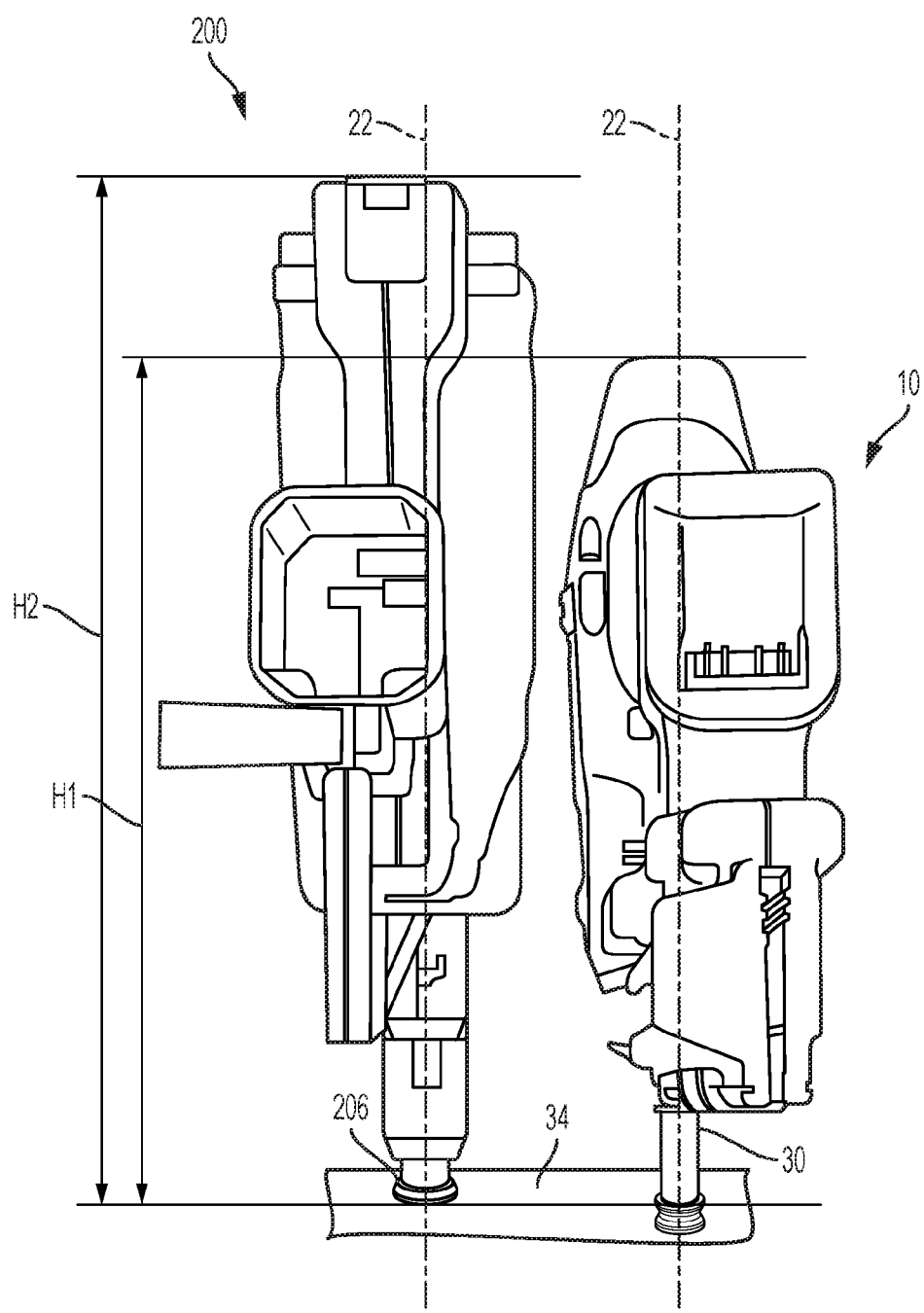
FIG. 6 is a side-by-side elevational view, taken from the bottom, illustrating the differences in height between the concrete nailers of FIG. 5.

Returning for the moment to FIGS. 5 and 6, the height H1 of the concrete nailer 10 can thus be less than 17 inches, for example, as short as 16 inches, compared to the height H2 of the second conventional concrete nailer 200, which must be 18½ inches, an increase of more than 12%. Thus the design of the second conventional concrete nailer 200 requires more metal and larger components, and is more unwieldy, heavier and more costly than the concrete nailer 10, and is less able to fit into the constricted space requirements that the concrete nailer 10 easily handles.

Referring to FIGS. 7, 10 and 11, the magazine cutout 28 is disposed proximate the drive track 20. As shown in greater detail in FIGS. 13, 14A and 14B, the magazine 24 includes a magazine interface 52 that is aligned along drive axis 22 when the magazine is attached to the concrete nailer 10.

Figure 14A:
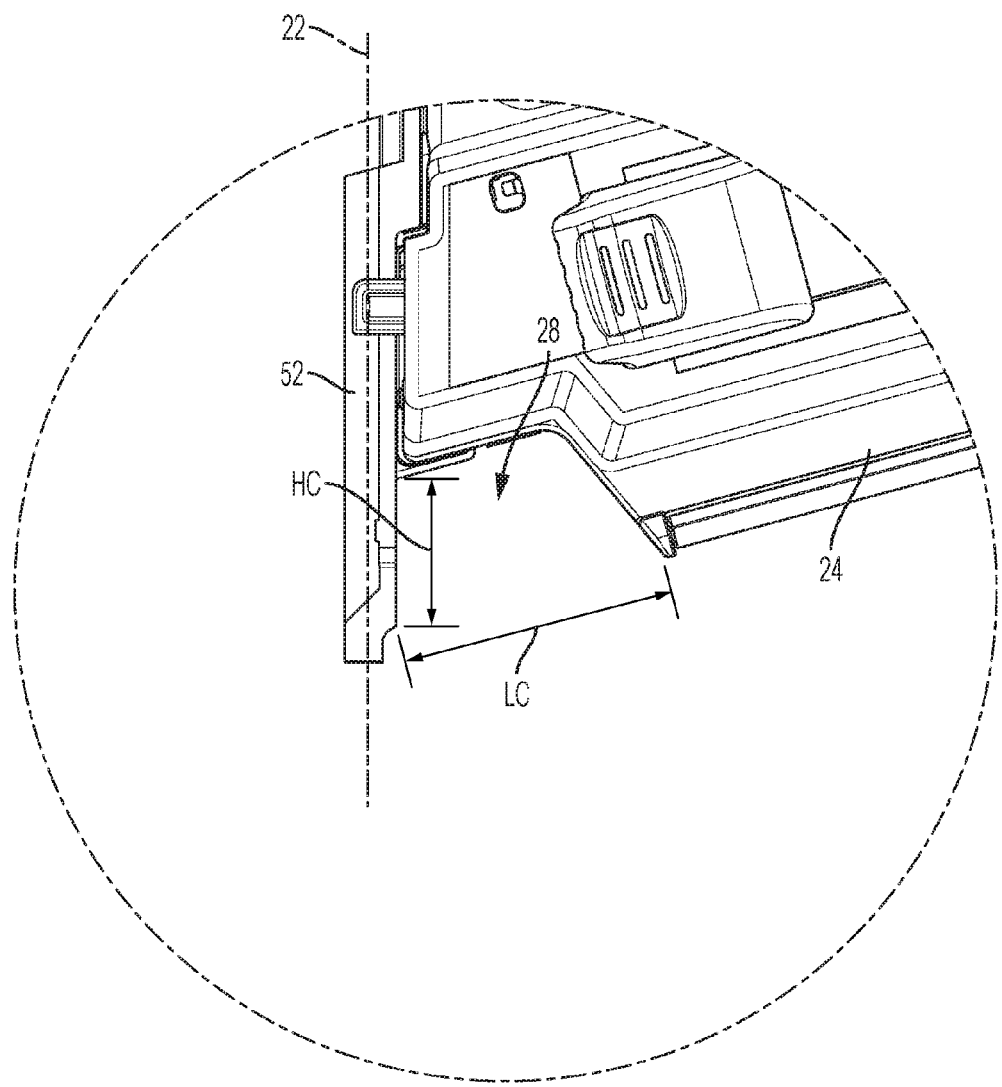
FIG. 14A is an enlarged elevational detail view of the circled portion of the magazine of FIG. 13.

FIG. 14A shows that the cutout 28 of magazine 24 has a length LC and a height HC.

Figure 12:
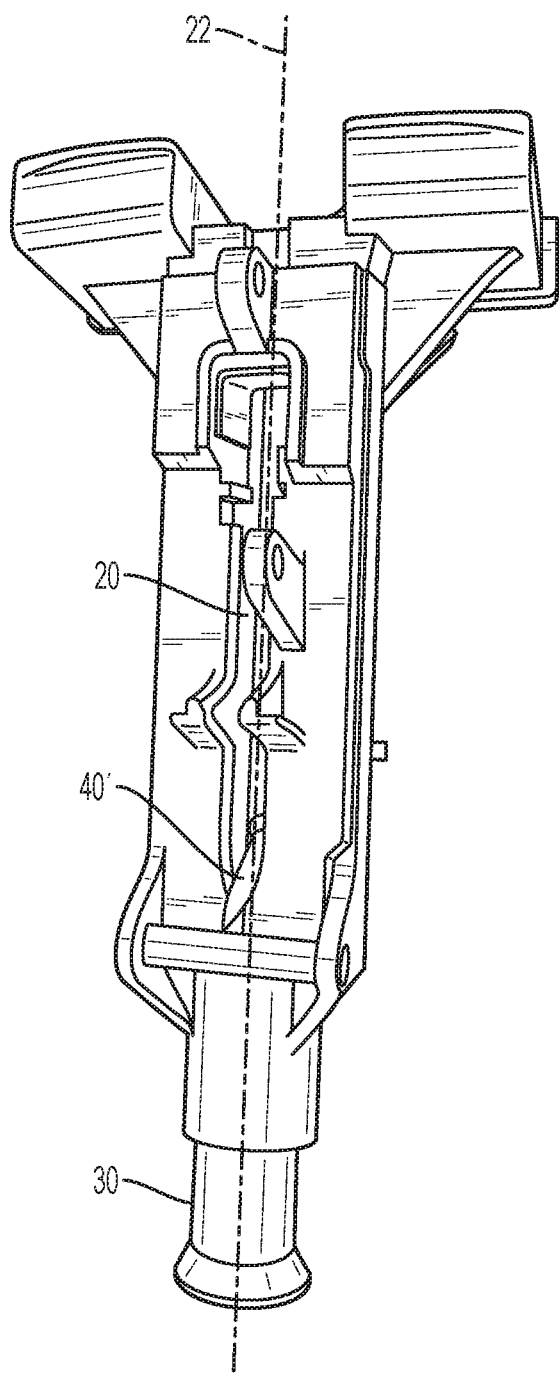
FIG. 12 is a partial elevational detail view of the contact trip and drive track subassembly of the concrete nailer of FIG. 7, illustrating what happens when a short nail becomes misaligned along the drive axis.
Figure 14B:
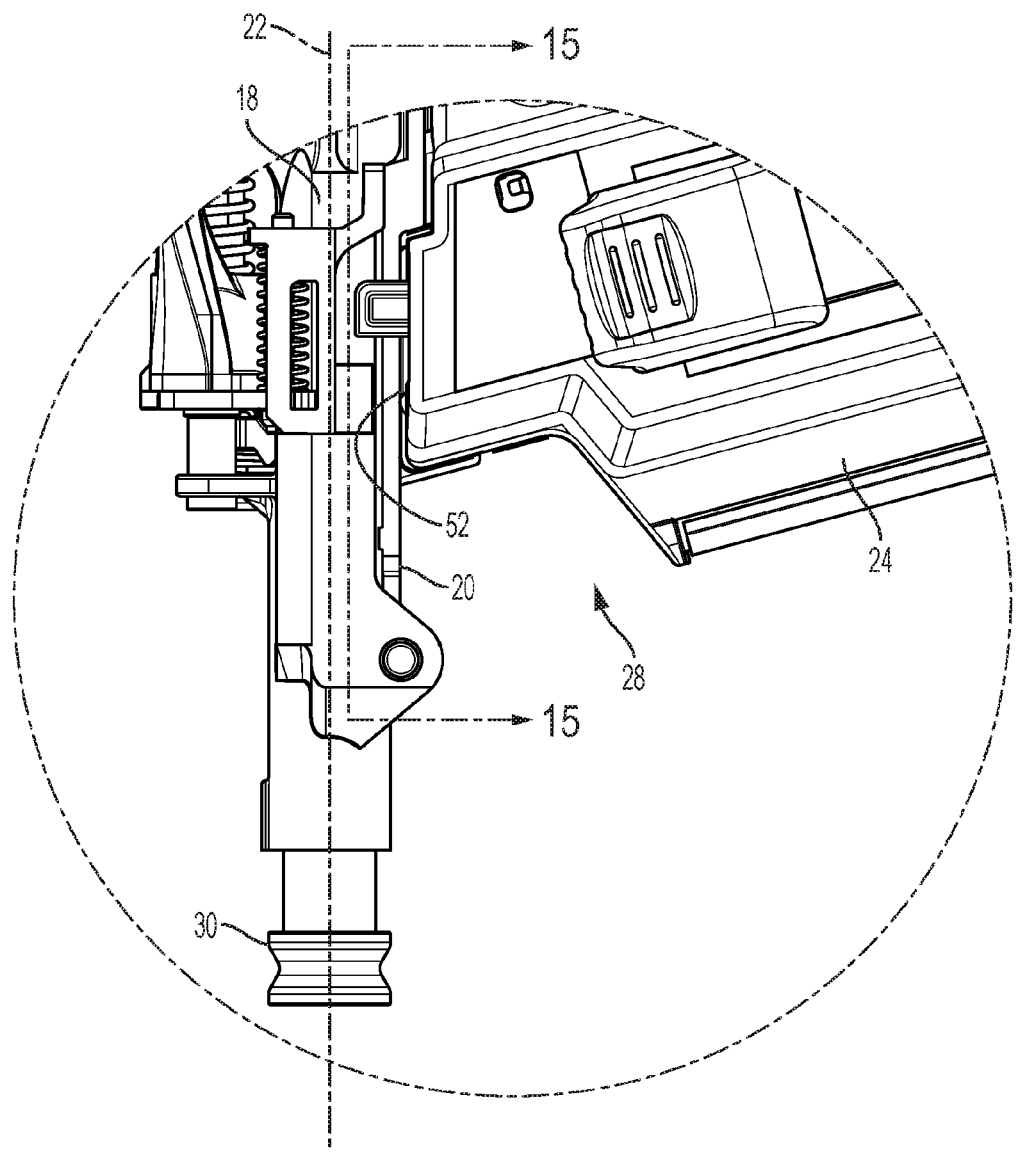
FIG. 14B is an enlarged elevational detail view of the portion of the magazine shown in FIG. 14A positioned proximate the drive track of the concrete nailer of FIG. 7.

In one embodiment, the length LC is about 28 mm, and the height HC is about 20 mm. When the magazine 24 is connected to the concrete nailer 10, as shown in FIG. 14B, the magazine interface 52 of magazine 24 is disposed proximate the drive track 20 of the concrete nailer 10, so that the drive axis 22 of the magazine interface shown in FIG. 13 is coincident with the drive axis 22 of the concrete nailer 10. However, at first glance, it is not intuitively apparent how a short nail 40, in particular, can be maintained in a desired orientation along the drive axis 22, in that the travel of the nail 40 along the drive track 20 is exposed to the cutout 28. That is because, as shown in FIG. 12, without support proximate the cutout 28, the nail would likely become skewed from the drive axis 22 and jam the mechanism, as shown at 40'.

Figure 15A:
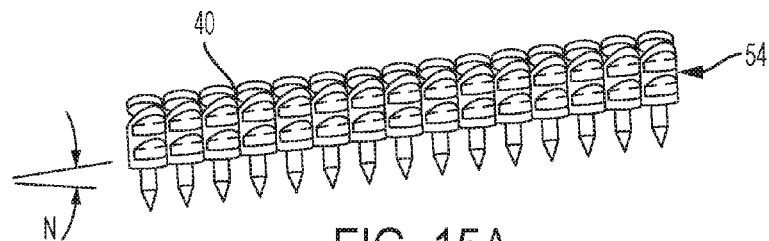
FIG. 15A is an enlarged elevational detail view of short nails mounted in a carrier of the present invention.
Figure 15B:
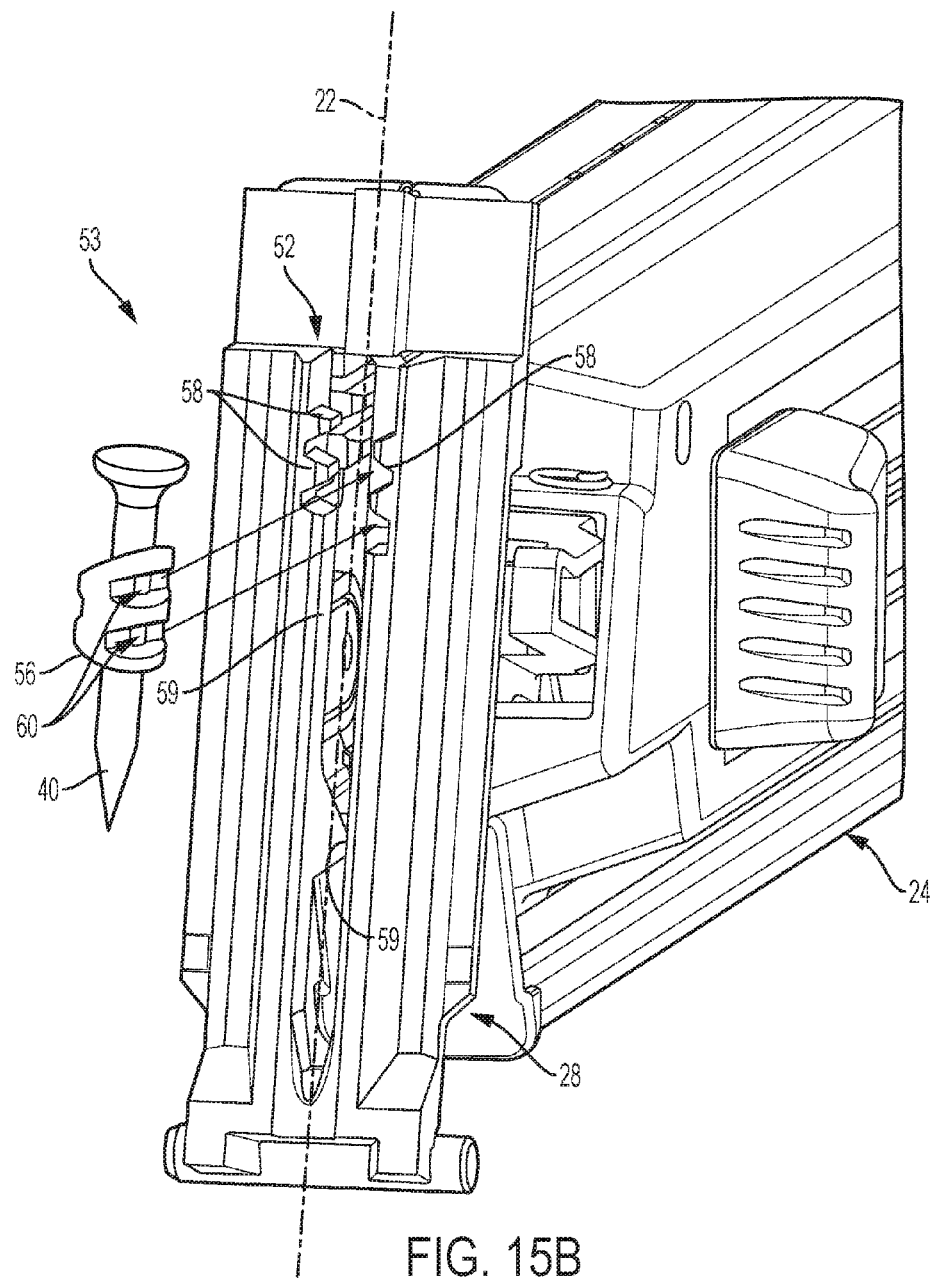
FIG. 15B is an enlarged perspective detail view of the magazine interface taken along line 15-15 of FIG. 14B, and illustrating a nail mounted in a portion of the carrier.
Figure 16:
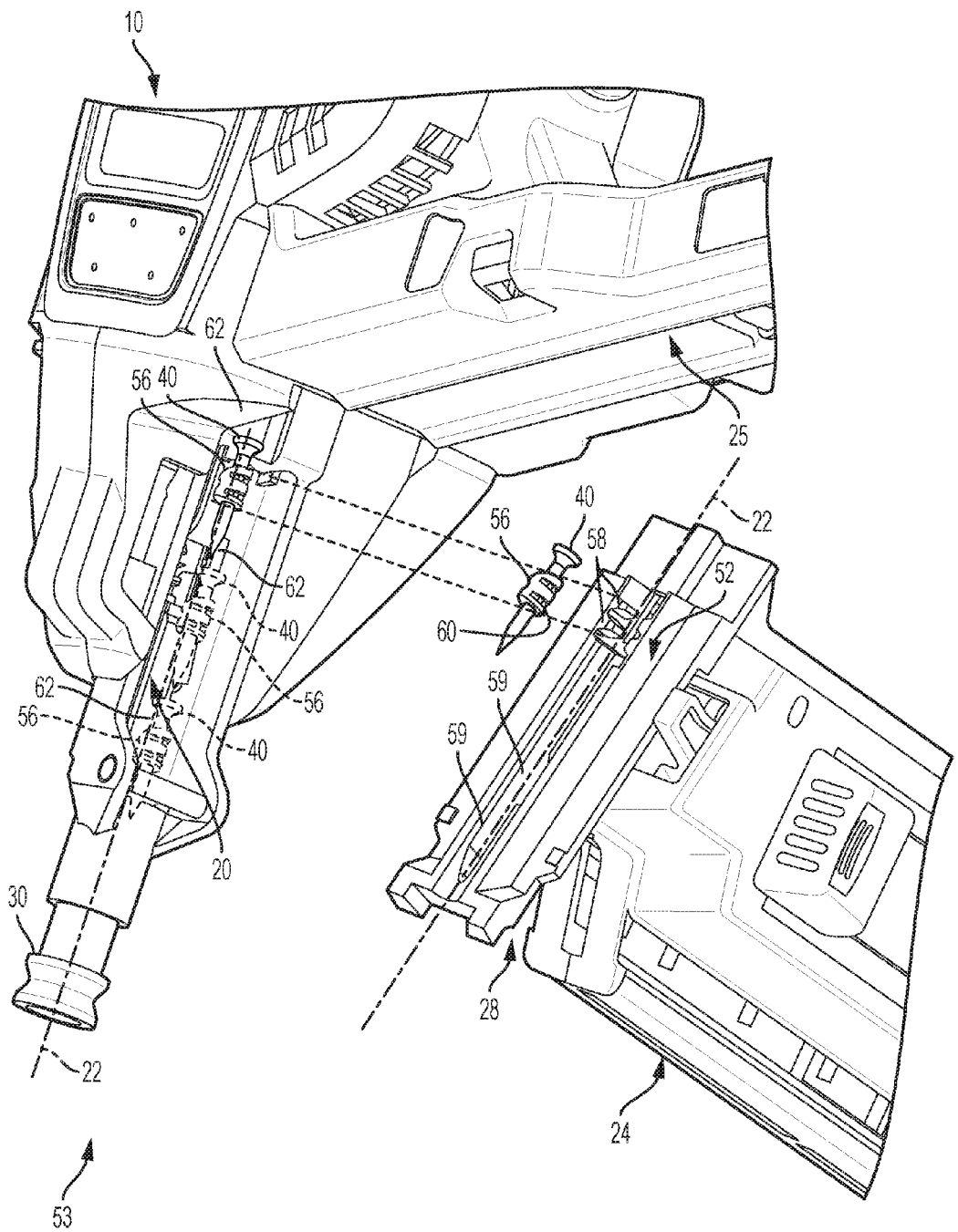
FIG. 16 is an exploded perspective detail view of the magazine interface of the magazine of FIG. 7 being positioned proximate the drive track of the concrete nailer of FIG. 7, and showing a system for aligning nails along the drive track of the concrete nailer.

FIGS. 15A, 15B and 16 show a system 53 of the present invention configured to maintain the desired orientation relative to a work surface 34 of nails as short as ½ inch in the drive track 20, notwithstanding the proximity of the nails 40 to the cutout 28.

As shown in FIGS. 15A and 15B, nails 40, 42 are mounted vertically in a plastic carrier 54, which is angled to match the angle N of the magazine 24. When the concrete nailer 10 is fired, a drive bar (not shown) of the drive system 18 strikes the top of the nail 40 presented to the concrete nailer drive axis 22 by the magazine interface 52, and separates a portion 56 carrying the nail 40 from the rest of the carrier 54. Portion 56 carries the nail 40 all the way along the drive track 20, and moves with the nail even as the nail is driven into a work surface 34. The orientation system 53 is configured to capitalize on this effect: the magazine interface 52 defines respective guide surfaces 58 and 59, and the carrier 54 defines guide surfaces 60 that match the configuration of guide surfaces 58. Furthermore, the drive track 20 of the concrete nailer 10 is also provided with guide surfaces 62. As shown particularly in FIG. 16, the respective guide surfaces 58, 59, 60 and 62 of the orientation system 53 cooperate to maintain the orientation of the nail 10 along the drive axis 22 during its entire travel along the drive track 20.

To nail the track 44 to concrete, the operator positions the nose 32 of the concrete nailer 10 above the track so that the cutout 28 formed in the bottom 26 of the magazine 24 clears at least one wall 48 of the track. The contact trip 30 of the concrete nailer 10 then engages the base 46 of the track 44 so that the contact trip is oriented perpendicular to the base of the track, while the cutout 28 still clears the wall 48. Then, while maintaining this orientation, the contact trip 30 is pressed against the base 46 of the track 44 so that the contact trip is fully actuated, and the concrete nailer 10 fires a nail 40, 42 through the base of the track and into the concrete 50.

It can now be seen that the concrete nailer 10 and magazine 14 of the present invention fulfill the long-felt need for a concrete nailer having a magazine which accommodates both short and long nails, has the flexibility to nail 2×4's into concrete, and which also satisfactorily nails to concrete the complete range of track presently available on job sites. While the emphasis has been placed on being able to nail 2×4's into concrete, it should be recognized that the concrete nailer 10, if desired, may nail other sizes of wood with similar thicknesses to concrete as well.

While the present invention has been described with respect to various embodiments, the present invention may be further modified within the spirit and scope of this disclosure. This application is therefore intended to cover any variations, uses, or adaptations of the present invention using its general principles. Further, this application is intended to cover such departures from the present disclosure as come within known or customary practice in the art to which this invention pertains and which fall within the limitations of the appended claims.

What is claimed is:

1. A method of nailing a channel to concrete using a concrete nailer having a magazine that includes a magazine body having a longitudinal length and a magazine interface at one end thereof, the magazine interface having a rear surface that opposes a forward surface of the magazine body, the channel having a U-shape of walls arranged vertically and a base connecting the walls, the method comprising:
    providing a cutout in a bottom portion of the magazine, the cutout defined by the opposing surfaces of the magazine interface and the magazine body;
    positioning a nose of the concrete nailer above the channel so that the cutout clears at least one wall of the channel;
    engaging the base of the channel with a contact trip of the concrete nailer oriented perpendicularly to the base of the channel while the cutout still clears the wall; then
    pressing the contact trip against the base of the channel so that the contact trip is fully actuated; and
    firing a nail through the base of the channel and into the concrete.

2. The method claimed in claim 1, wherein the dimensions of the channel range from 30 mm to 100 mm wide and from 20 mm to 70 mm deep.

3. The method claimed in claim 2, wherein the magazine is configured to accept nails having lengths ranging from ½ inch to at least 2¼ inches.

4. The method claimed in claim 2, wherein the channel is 30 mm wide and 70 mm deep.

5. The method claimed in claim 1, further comprising:
    providing a drive system including a drive track configured to guide a nail along the drive axis; and
    guiding the nail along the drive track so that the orientation of the nail relative to the channel is maintained during travel of the nail along the drive track.

6. The method claimed in claim 5, wherein the cutout is disposed proximate to the drive track.

7. The method claimed in claim 5, wherein the step of guiding includes guiding a portion of a carrier, in which the nail is disposed, along the entire length of the drive track, to maintain the orientation of the nail relative to the channel.

8. A method of maximizing the reach of a concrete nailer having a housing, a nose portion and a contact trip, the method comprising:

provide a magazine accommodating nails having lengths ranging from ½ inch to at least 2¼ inches, the magazine including a magazine body having a longitudinal length and a magazine interface at one end thereof, the magazine interface having a rear surface that opposes a forward surface of the magazine body;

providing a cutout in a bottom portion of the magazine, the cutout defined by the opposing surfaces of the magazine interface and the magazine body; and connecting the magazine to the housing such that the magazine interface of the magazine is proximate to the nose portion and so that, when the contact trip is fully actuated, a distance from a work surface to a portion of the magazine proximate the nose portion is in the range of from 60 mm to 70 mm.

9. The method claimed in claim 8, wherein the distance from the work surface to a portion of the magazine proximate the nose portion is 70 mm.

10. A method of minimizing the height of a concrete nailer having a housing and a contact trip, the height being measured from a work surface to the top of the housing, comprising:

providing a magazine including a magazine body having a longitudinal length and a magazine interface at one end thereof, the magazine interface having a rear surface that opposes a forward surface of the magazine body;

providing a cutout in a bottom portion of the magazine, the cutout defined by the opposing surfaces of the magazine interface and the magazine body; and connecting the magazine to the housing so that the magazine provides the concrete nailer with a reach ranging from 60 mm to 70 mm into a channel having a U-shape when the contact trip is fully actuated against a bottom of the channel.

11. The method claimed in claim 10, wherein the height of the concrete nailer is less than 17 inches, and the magazine accommodates nails having lengths ranging from ½ inch to at least 2¼ inches.

* * * * *